United States Patent

Jana et al.

[11] Patent Number: 6,132,076
[45] Date of Patent: Oct. 17, 2000

[54] SINGLE EXTRUDER SCREW FOR EFFICIENT BLENDING OF MISCIBLE AND IMMISCIBLE POLYMERIC MATERIALS

[75] Inventors: Sadhan C. Jana, Fairlawn, Ohio; Earl W. Scott, Mt. Vernon, Ind.; Uttandaraman Sundararaj, Montgomery, Ala.

[73] Assignee: General Electric Company, Pittsfield, Mass.

[21] Appl. No.: 09/208,190

[22] Filed: Dec. 9, 1998

[51] Int. Cl.[7] .................................................. B29B 7/14
[52] U.S. Cl. .............................................. 366/81; 366/319
[58] Field of Search ............................. 366/79, 80, 81, 366/82, 88, 89, 319; 425/208

[56] References Cited

U.S. PATENT DOCUMENTS

| | | | |
|---|---|---|---|
| 1,626,675 | 5/1927 | Hanley, Jr. . | |
| 2,484,506 | 10/1949 | Hawk . | |
| 3,593,843 | 7/1971 | Hill . | |
| 3,788,612 | 1/1974 | Dray . | |
| 3,901,482 | 8/1975 | Kieffaber . | |
| 3,924,839 | 12/1975 | Millauer | 366/81 |
| 3,989,941 | 11/1976 | Gasior et al. . | |
| 4,015,833 | 4/1977 | Kim | 366/82 |
| 4,074,362 | 2/1978 | Kruder et al. | 366/82 |
| 4,092,015 | 5/1978 | Koch | 366/81 |
| 4,185,060 | 1/1980 | Ladney, Jr. | 366/89 |
| 4,215,978 | 8/1980 | Takayama et al. | 366/89 |
| 4,227,870 | 10/1980 | Kim | 366/87 |
| 4,834,543 | 5/1989 | Nortey . | |
| 4,840,492 | 6/1989 | Nakamura | 366/81 |
| 4,940,329 | 7/1990 | Dienst | 366/82 |
| 4,964,730 | 10/1990 | Alzner et al. | 366/81 |
| 5,035,509 | 7/1991 | Kruder | 366/89 |
| 5,071,256 | 12/1991 | Smith et al. | 366/81 |
| 5,332,309 | 7/1994 | Ramazzotti et al. . | |
| 5,348,388 | 9/1994 | Geyer . | |
| 5,551,777 | 9/1996 | Tjahjadi et al. | 366/81 |
| 5,573,331 | 11/1996 | Lin | 366/81 |
| 5,932,159 | 8/1999 | Rauwendaal . | |

FOREIGN PATENT DOCUMENTS

| | | |
|---|---|---|
| 59-198132 | 9/1984 | Japan . |
| 1495740 | 12/1977 | United Kingdom . |

OTHER PUBLICATIONS

Abstract JP 59198132, Sep. 11, 1984.
Abstract JP 55053543 Apr. 19, 1980.

*Primary Examiner*—Tony G. Soohoo

[57] ABSTRACT

A single extruder screw is presented which includes a plurality of equidistant undercut barriers disposed in a preselected pattern within the channel of an extrusion screw. The undercut barriers are disposed in the first metering stage and second metering stage and provide increased dispersive and distributed mixing for highly viscous difficult to blend materials. In another embodiment the single extruder includes a slotted blister ring, having slots and lands disposed thereon, positioned between the first metering stage and the vent zone to further increase the amount of mixing.

16 Claims, 7 Drawing Sheets

UC (MADDOCK) MIXING SECTION-1967

EGAN MIXING SECTION

BLISTER RING

PIN MIXING SECTION

DULMAGE MIXING SECTION

SAXON MIXING SECTION

PINEAPPLE MIXING SECTION

SLOTTED SCREW FLIGHT

CAVITY TRANSFER MIXING SECTION

SINGLE EXTRUDER SCREW FOR EFFICIENT BLENDING OF MISCIBLE AND IMMISCIBLE POLYMERIC MATERIALS

BACKGROUND AND RELATED ART

1. Field of the Invention

This invention relates to extruders of the type which employ single screws to mix material to be extruded. Specifically this invention relates to the use of specific patterns of undercut barriers to increase interfacial area between material elements and heat/mass transfers to achieve greater distributive and dispersive mixing.

2. Description of the Related Art

Figure 1:
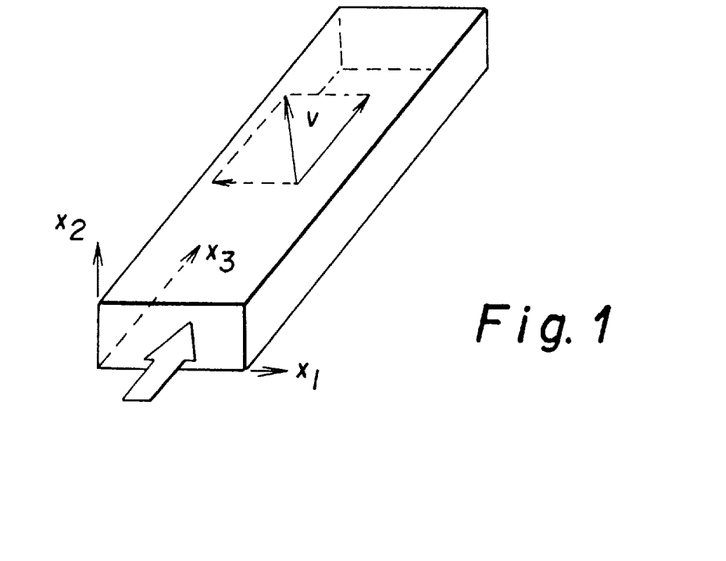
FIG. 1 is a graphical perspective representation of a prior art extruder screw channel.

Single screw extruders are widely used in the plastics industry as mixers and pumps. The simplest design consists of a screw, which rotates inside a close fitting cylindrical barrel. The screw typically includes a feed section, a transition section, and a metering section. Virtually all studies of single screw extruders are based on the unwound representation of the screw channel. Referring to FIG. 1 the relative motion of the screw and the barrel appears as a plate which moves diagonally on top of the channel in the direction of the arrow marked "v". The fluid flow in the channel can be decomposed into two components, namely, a cross flow in the $x_1$–$x_2$ plane and an axial flow in the $x_3$ direction. The axial flow pumps the materials forward through the screw and the cross flow mixes the material. However, depending on the characteristics of the material the mixing in such a prior art screw is poor.

Figure 2:
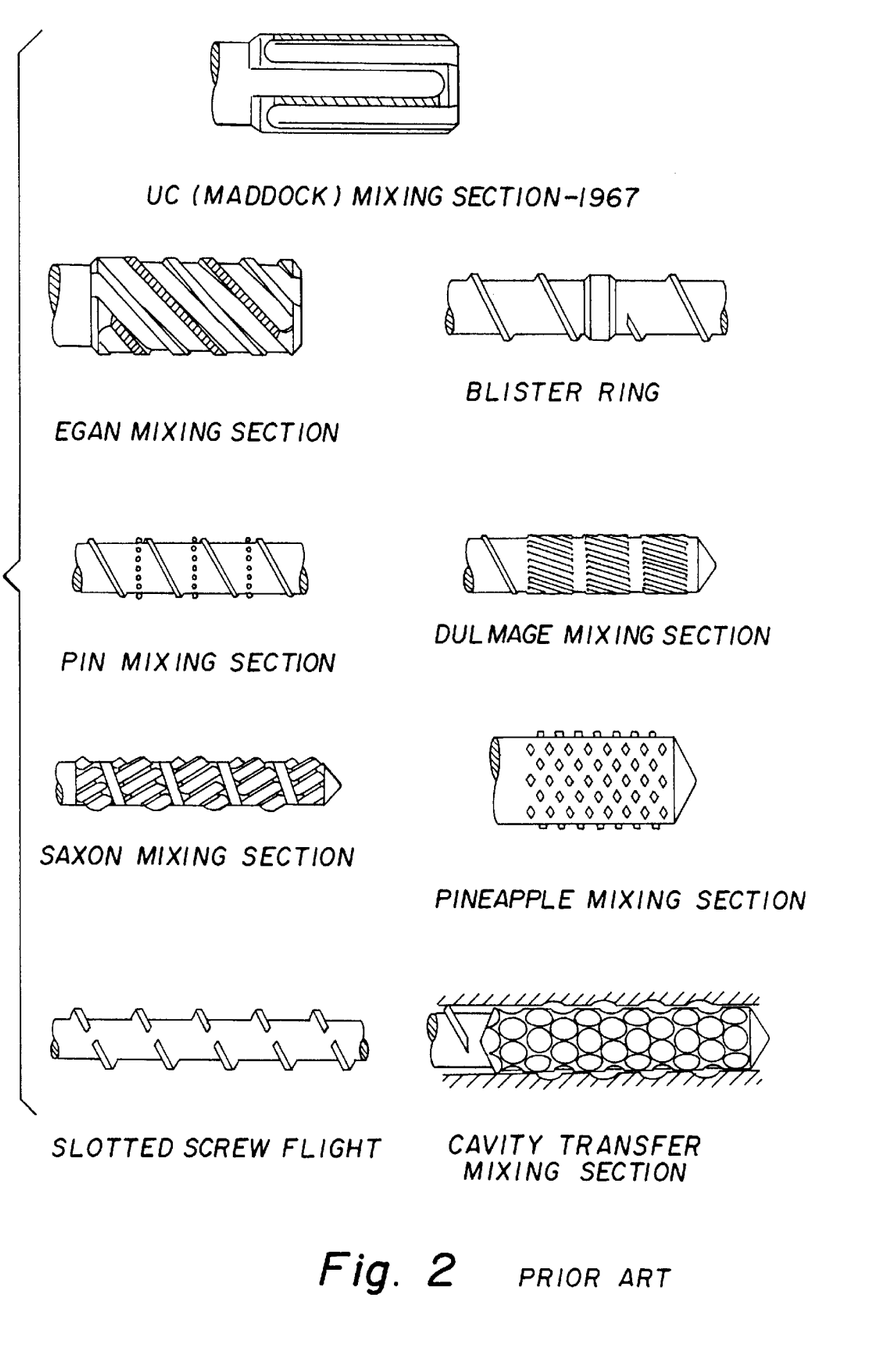
FIG. 2 is a plan view in partial section of various mixing sections of extruder screws of the prior art.

With respect to FIG. 2, typically, a mixing section such as a Maddock mixing section, a pin mixing section, a pineapple mixing section, a blister ring, and so on, is added to the screw to increase its dispersive and/or distributive mixing capability. However, these mixing sections are typically relatively short compared to the length of the screw. The screw section responsible for mixing is typically characterized by its closeness to the outer barrel to generate the high shear stress required for a dispersive mixing (e.g., Maddock section and blister ring), or by a large number of small units affixed on the root of the screw for a distributive mixing (e.g. pin and pineapple mixing sections).

Another prior art mixing screw, the barrier screw, is designed based on the solid melt distribution as it is conveyed down the metering section. The barrier screw has two channels, used to separate melt from solid, of varying width separated by an undercut barrier flight. The width of the channel is proportional to the amount of solid or melt. Initially, as pellets start to melt, the melt pool is pushed into the narrow melt channel. The melt channel grows larger as more melt is collected. The Barr ET screws (namely, a Barr ET Barrier screw (manufactured by Robert Barr Incorporated of Virginia Beach, Va.) is claimed to have 30 to 50% better melting rate through mixing of pellets with fresh melt.

A prior art modified double wave screw typically has two equal width channels separated by an undercut barrier flight wherein the roots of each channel go up and down like a wave. This continually reverses and forces melted plastic back and forth across the barrier. The material in the channel is alternately subjected to high shear and then low shear as it crosses between the barrier and the barrel wall. Usually these double wave mixing sections are located in the metering section where the plastic has already been melted and consist of 3 to 4 waves. Although double wave screws increase the mixing of material as it flows through an extruder, with certain types of materials the level of mixing is still less than optimal.

Many of the extruder screws of the prior art rely on molecular diffusion to affect mixing, while smart extruder screws or other type of blenders of the prior art have been designed to augment mixing and exploit the capabilities of such devices to generate new interfacial area between the polymeric components. The degree of mixing, therefore, is a strong function of rate of creation of polymer-polymer interface, which in turn depends on the design of the extruder or blender and viscosity and interfacial tension between the components. The mechanism by which new interfaces are repeatedly created is known as "distributive" mixing. In distributive mixing, the length scale of each component is dramatically reduced to thin striations due to repeated stretching and folding of each phase with the resultant mixture being a collection of alternating thin striations of the phases. Note that a distributively mixed material still has two-phases, though on a very microscopic scale. On a macroscopic scale, however, the material looks "mixed" and the various properties are now governed by the contributions from both the components.

In the case of blending of immiscible polymeric components, the objective is to produce dispersions of fine droplets/particles of the minor component in the continuous phase formed by the major component. The mixing mechanism that produces this dispersed-continuous morphology is popularly known as "dispersive mixing". In this case, the interfacial tension between the components is finite.

Dispersive mixing occurs in two stages. First, the minor component stretches into thin striations due to a "distributive" mixing mechanism of the blending device. The stretching continues until a critical local length scale is reached, such that the interfacial forces become more important than the viscous forces and the striations break into fine droplets. These droplets may retain shape and size, or, in turn, may deform, stretch into striations, and break further into finer droplets. The stretching and breakup processes repeat until an asymptotic droplet size distribution is reached such that no further breakup is possible. Some secondary processes, such as coalescence of two small drops into a larger drop compete with the breakup process and influence the final size distribution. Secondly, these droplets solidify due to freezing of the melt and become dispersed particles. The physical properties of component materials, operating conditions of blending, and design of blender, all have direct bearing on the quality of mixing of immiscible blends.

Figure 3:
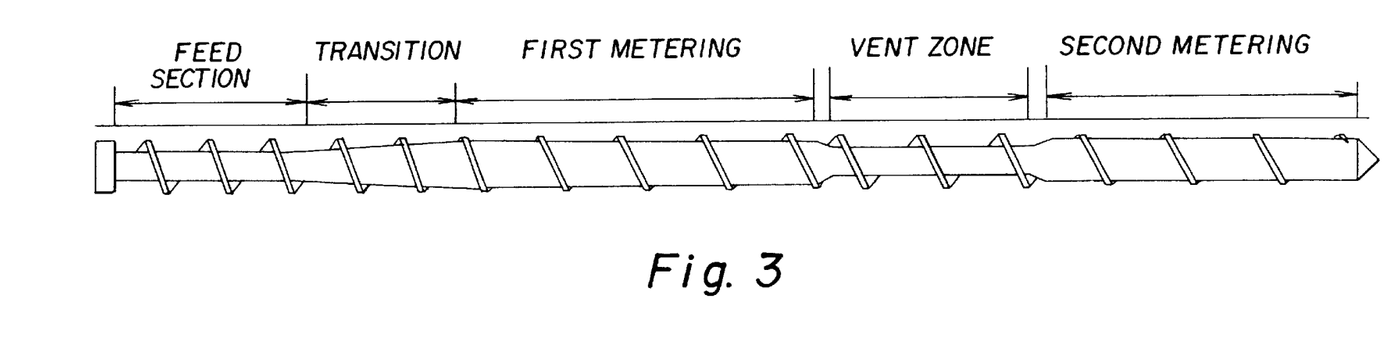
FIG. 3 is a plan view of a two-stage single extruder screw of the prior art.

A typical two-stage single extruder screw serves three functions: (1) feeding; (2) melting and mixing; and (3) metering. FIG. 3 is a typical two stage single extruder screw of the prior art including a number of zones with zones labeled as feeding, transition, first metering, venting, and second metering. Melting of solids which starts in the transition zone, also called compression zone, should end early in the metering zone. Some degree of mixing between unmelted solids with the melt may occur in the transition zone itself. Many commercially available extruder screws of the prior art are specially designed to perform this specific function and guarantee very early melting, an example being the Barr ET screw as described herein above. Another popular screw, the barrier screw, separates melts from unmelted solid so that the solid is always subjected to high shear forces caused by friction with the barrel wall and therefore melts rapidly. The first metering section simply conveys the melt by drag flow into the venting zone and the second metering zone pumps the melt into a stranding die.

Figure 4:
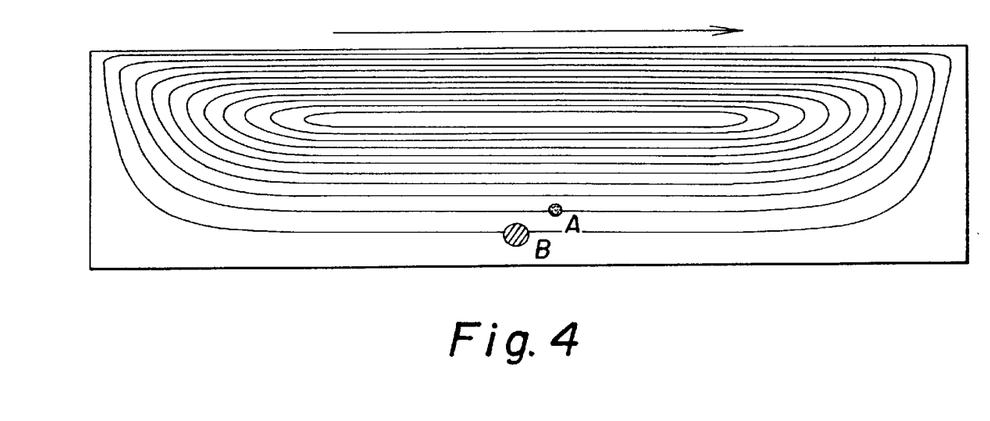
FIG. 4 is a graphical representation of cross-channel flow of material in a prior art extruder screw.

There are no inherent mechanisms built into the screw design of the prior art to ensure mixing of two or more polymeric materials. FIG. 4 shows cross-channel flow in the metering section of an unwound screw of the prior art wherein the motion is mostly circulatory. There is no reorientation mechanism and therefore, two elements of fluid A and B will most likely never mix with each other, except through molecular diffusion. In some cases it is advantageous to provide auxiliary mixing sections at the end of first metering zone to improve mixing. Examples of such auxiliary mixing sections are shown in FIG. 2 and include a blister ring, an Egan mixing unit, a pineapple mixing section, a cavity transfer mixer, a Dulmage mixing section, among others. Distributive and dispersive mixing are produced with the aid of these auxiliary mixing sections as the melt is forced through the small gap between the barrel and the mixing section. The typical length of these auxiliary mixing sections range from 2–4 times the diameter of the screw. The degree of mixing achievable from these sections is usually small as the melt spends only a short time in the mixing zone. In addition, the auxiliary mixing sections typically cause a large pressure drop.

Another screw design of the prior art aimed at improving distributive mixing in a single extruder screw includes a series of undercut baffles placed along the screw channels to disrupt streamlines of the cross-channel flow. The baffle locations are alternated periodically to produced chaotic mixing of the melt. There are several limitations in such an extruder screw. First, if the channels are not completely filled, only a part of the channel cross-section is available for chaotic mixing; therefore reducing the extent of distributive mixing. This is especially true for polymers available in the form of low bulk density powder. Secondly, the aspect ratio of the screw channel must lie between 4 and 6 for realization of appreciable chaotic mixing. This poses serious restriction on the available flow area and throughput rates as the undercut baffles also occupy some physical space. Thirdly, no dispersive mixing mechanisms are provided by the undercut baffles of such a design. As stated herein above it is advantageous for an extruder screw to be able to produce both dispersive and distributive mixing.

It is apparent from the above there exists a need in the art for an extruder which is capable of increased dispersive and distributive mixing. It is a purpose of this invention to fulfill this and other needs in the art in a manner more apparent to the skilled artisan once given the following disclosure.

SUMMARY OF THE INVENTION

The above discussed and other drawbacks and deficiencies of the prior art are overcome or alleviated by the single extruder screw of the present invention. The single extruder screw of the present invention includes a plurality of undercut barriers disposed in a preselected pattern within the channel of an extrusion screw. The undercut barriers are disposed in the first metering stage and second metering stage and provide increased dispersive and distributed mixing for highly viscous difficult to blend materials. The single extruder screw of the present invention further includes a slotted blister ring, having slots and lands disposed thereon, positioned between the first metering stage and the vent zone to further increase the amount of mixing.

The undercut barriers increase distributive mixing by increasing the interfacial area of the material by splitting the stream of material into thin striations at preselected intervals and providing for a secondary recirculatory flow within the channels formed by the undercut barriers. Dispersive mixing is also increased by the undercut barriers when the thin striations caused by the barriers break into droplets. The barriers also create areas of high shear for the material, which contribute to dispersive mixing, at the zones between the tips of the barriers and the barrel wall. In addition, the slotted blister ring increases dispersive mixing at the zones between the lands and the barrel wall and increase distributive mixing by increasing the interfacial area of the material as it passes through the slots of the ring.

DETAILED DESCRIPTION OF THE INVENTION

Figure 5:
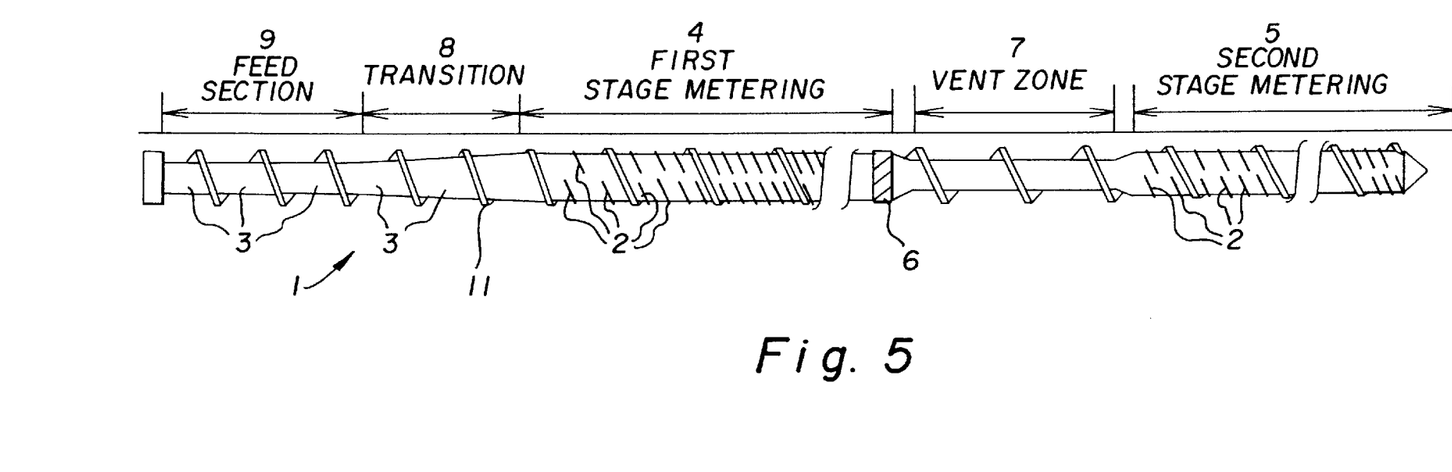
FIG. 5 is a plan view of a single extruder screw of the present invention incorporating undercut barriers and a blister ring.

Referring to FIG. 5 one embodiment of an extruder screw 1 in accordance with the present invention is shown including mixing features in the form of a series of undercut barriers 2 placed on the screw channels 3 of first metering zone 4 and second metering zone 5 and a slotted blister ring 6 located between the first metering zone and vent zone 7. The undercut barriers 2 may also be placed in the whole or part of the compression, or transition, zone 8 adjacent to feed zone 9. Extruder screw 2 of the present invention improves distributive mixing in two ways, first the undercut barriers 2 act as a splitting mechanism to split material streams. Secondly, the undercut barriers are positioned within the screw channel to change the streamline patterns of cross-channel flow typical of prior art extruder screws as described herein before. The splitting mechanism coupled with relative motion of the screw advantageously increases intermaterial area generation. The change in streamline patterns also produces increased intermaterial area generation via stretching and folding mechanisms brought about by undercut barriers 2 as will be more fully described herein below.

Figure 6:
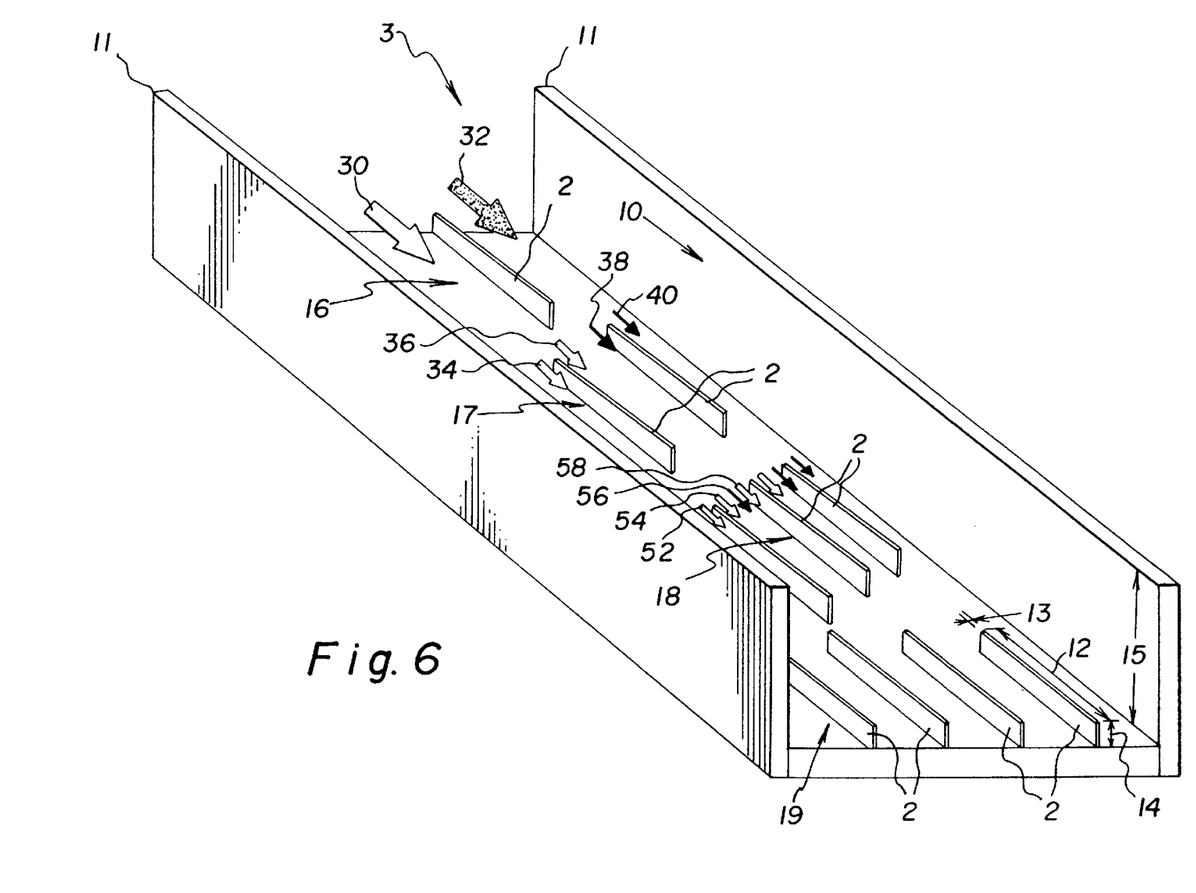
FIG. 6 is a graphical perspective representation of an extruder screw channel in accordance with the present invention.

Referring now to FIG. 6 there is shown an unwound view of a channel 3 of metering stage 4 of the extruder screw 1 shown in FIG. 5. In accordance with the present invention undercut barriers 2 are aligned parallel to the primary screw flight 10 defined by primary screw 11. The length 12, width 13, and height 14 of undercut barriers 2 play a significant role in the blending performance of screw 1. In accordance with the present invention, length 12 of undercut barriers 2 is expressed in relation to the 360 degree turn length of primary screw 11 of extruder screw 1 and may advantageously range from one quarter of a turn to a full turn of the primary screw 11. The height 14 of the undercut barriers 2 is expressed in relation to the height of primary screw 11 which defines the depth 15 of screw channel 3. The height 14 of undercut barriers 2 may advantageously range between ¼ of channel depth 15 to ¾ of the channel depth. The width 13 of undercut barriers 2 is determined as a function of the mechanical strength of the materials of construction as well as the material to be extruded.

As discussed herein above the relative placement of undercut barriers 2 is important to the efficient performance of extruder screw 1. As best shown in FIG. 6 undercut barriers 2 are disposed along screw 3 in stages 16–19. In the example shown in FIG. 6 the undercut barriers 2 successive stages do not overlap each other along the primary flight 10 or axial direction. It is, however, within the scope of the present invention that any two successive stages of barriers 2 may or may not overlap in terms of their relative axial position along channel 3.

Still referring to FIG. 6 it can be seen that the number of undercut barriers 2 increases in each stage from 16 to 19. The number and placement of the barriers in each successive stage will be more fully explained herein below, however it is important to note that each increase in the number of barriers also decreases the flow area of screw channel 3. In order to accommodate the reduction in flow area in channel 3, due to the successive increase in the number of barriers 2 of each stage 16–19, the lead of the primary screw 11 is increased which in effect widens the channel 3.

Figure 7:
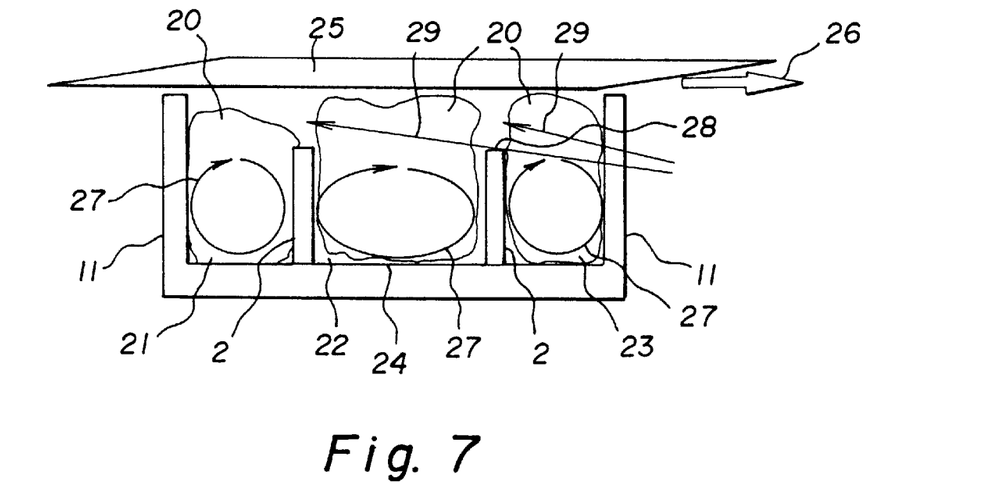
FIG. 7 is a graphical representation of an extruder screw channel in accordance with the present invention.

In operation the undercut barriers 2 increase the blending efficiency of extrusion screw 1 in two important ways. First undercut barriers 2 split the axial flow of extruding materials at regular intervals, coincident with each successive stage of barriers, into thin striations. Secondly, and as best shown with reference to FIG. 7, as extruded material 20 flows through screw channel 3, the barriers 2 split the material into thin striations carried within barrier channels 21, 22, and 23 bounded by the barriers, 2 the primary screw 11 the screw root 24 and the extruder barrel 25. The relative motion of extruded material 20 with respect to screw channel 3 is represented by arrow 26. Within each barrier channel 21–23 extruded material 20 also moves in a recirculatory flow pattern represented by arrows 27. When channel 3 is filled with extruded material 20 the portion of the extruded material 20 between the barrier tip 28 and the barrel 25 is subjected to intense shear forces in the areas represented by arrows 29. The intense shear results in an increase in heat of the extruded material 20 promoting melting and providing reorientation of melts for efficient dispersive mixing as described herein before. This is very useful to disperse difficult to melt materials, e.g., rubber.

The patterns of barriers along the channel determines to what extent the distributive mixing, arising from the splitting mechanism, can be obtained. In the specific example shown in FIG. 6, in the first stage 16 there are two streams 30, 32 which are split into four streams 34, 36, 38, 40 in the second stage 17, which in turn split into eight streams 42, 44, 46, 48, 50, 52, 54, 56 in the third stage 18 and so on. In the example shown, the number of barriers 2 increases by one in each successive stage 16–19, however other patterns of barriers are within the scope of the present invention as will be more fully described herein below. It is important to note that the relative motion between barrel 25 and screw 1 causes secondary, or recirculatory, flow 27 in the barrier channels defined by the undercut barriers 2 which further provides reorientation of melts for efficient mixing. An extruder screw of the present invention provides the combined actions of stream splitting, reorientation, and intense shear mechanisms to increase the efficiency of both distributive and dispersive mixing.

Referring again to FIG. 5, the undercut barriers 2 are disposed in first metering section 4 and second metering section 5 which account for approximately half of the length of screw 1. Relative to extrusion screws of the prior art, the extruded material, or polymer, 20 in the melt condition, spends a longer time in the vicinity of the undercut barriers 2 while experiencing intense shear in the regions of small clearance between the flight and the barrel wall, and the barriers and the barrel wall, in an embodiment of the present invention. This advantageously results in a higher degree of stretching of intermaterial surface than in the prior art.

Figure 8:
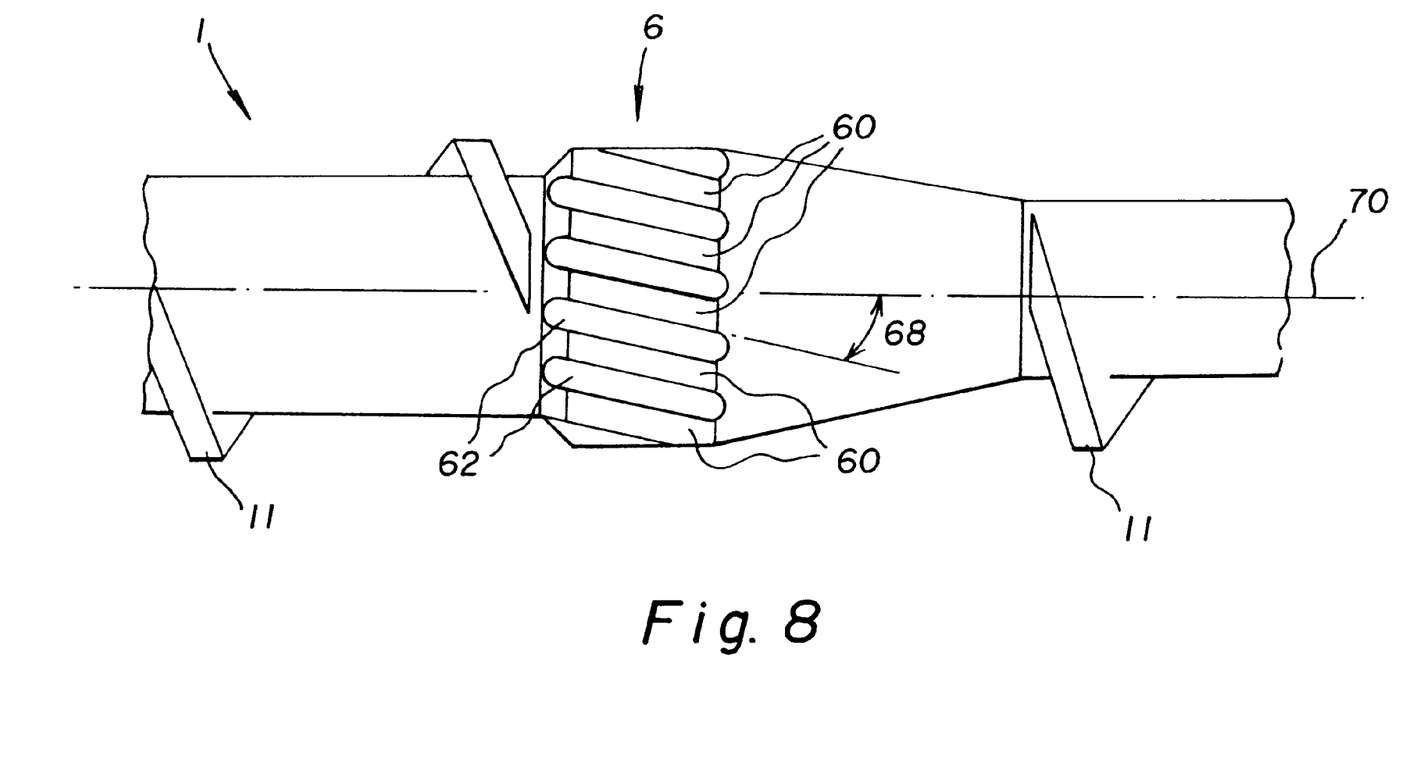
FIG. 8 is a plan view of a slotted blister ring of the present invention.

Also shown in FIG. 5 is a blister ring 6 arranged on extrusion screw 1 between first metering stage 4 and vent zone 7. As best shown in FIG. 8 blister ring 6 includes multiple slots 60 disposed at predetermined angles represented by 68 relative to the axis 70 of extruder screw 1. Slots 60 are positioned between parallel lands 62. Blister ring 6 creates a restriction to flow of melt material 20 such that screw channel 3, upstream of the blister ring, namely the first metering stage 4, remains filled with material allowing the undercut barriers 2 to perform as described herein above. In addition, blister ring 6 provides high shear forces to material 20 as it passes through a clearance between the blister ring and the barrel. A clearance, based on the material being processed, between the blister ring and the barrel, is provided to minimize the pressure drop and control the heat generated as the material passes through the blister ring 6 portion of screw 1. During operation blister ring 6 ensures that screw channel 3 in the first metering stage 4 remains filled with material 20, wherein undercut barriers 2 effectively provide the splitting, stretching and folding mixing described herein above. In addition, slots 60 on blister ring 6 provide additional reorientation to the melt and thereby, additional mixing. Blister ring 6 is especially useful in maintaining a balance of the material flux between the feed zone 9 and the first metering zone 4 which true for material 20 having poor feeding capabilities such as low bulk density powders, for example.

The present invention will now be described with reference to the specific examples shown in FIGS. 8 and 9, and Table 1. The undercut barriers 2 are alternated between one and two in successive stages along the channel 3 of the first metering zone 4 and second metering zone 5. In the area of one undercut barrier 2, the barrier is placed at the middle of the channel 3, that is midway between primary flight 10. In the areas where undercut barriers 2 are located adjacent to one another, they are located at ⅓ and ⅔ of the channel width as measured between primary flight 10. The length 12 of each barrier 2 spanned 0.57π D along the screw channel, where D is the screw diameter along the primary flight 10, represented by 64, and is 2½ inches in the example shown. The barrier height 14 and width 13 are respectively 0.5 H, where H is the respective channel depth represented by 66 (or the height of primary screw as shown in FIG. 6), and in the example shown is ⅛ inch. The aspect ratio values of the primary channels, their height to width ratio, were 10.3 and 7.8 respectively in the first and second metering sections. As described herein above this aspect ratio is much greater than that of the prior art thereby providing an increased flow area.

The blister ring 6 is approximately 0.6 D long and a clearance of 0.09 inch is maintained between the barrel wall and the blister ring. The dimensions of the slotted sections are shown with reference to FIG. 8 wherein slots 60 are 0.25 inches wide and 0.235 inches deep, and lands 62 are 0.25 inches wide. The angle represented by 68, relative to axis 70 of extruder screw 1 is about 6 degrees or 0.1 radian. Because of the relatively small number of undercut barriers 2

(relative to the embodiment shown in FIG. 5) the degree of stream splitting in this embodiment achieved is less than optimal. Nevertheless, the degree of reorientation from secondary recirculation flow 27 obtained from the barriers provides an excellent distributive mixing. A major part of dispersive mixing is achieved by the shearing forces caused by the friction of passing material between the tips of the barriers 2 and the barrel wall 25. In addition, although the material spends a short amount of time passing through slotted blister ring 6, the tight clearance between lands 60 and barrel wall 25 provided intense shear forces to the material to further increase dispersive mixing.

TABLE 1

Design information for one embodiment of the screw of the present invention having a 2.5 inch, 40:1 length/diameter ratio, two stage extruder screw.

| Section | Length, inch | Lead, inch | # of parallel flights | Channel depth, inch | Flight width, inch |
| --- | --- | --- | --- | --- | --- |
| Feeding | 20 | 2.5 | 1 | 0.505 | 5/16 |
| Transition | 27 | 2.5 | 1 | To 0.235 | 5/16 |
| 1st metering | 26 | 3.25 | 2 | 0.235 | 5/16 |
| Vent | 10 | 2.5 | 1 | 0.524 | 5/16 |
| 2nd metering | 10.5 | 3.25 | 2 | 0.312 | 5/16 |

Three blends of materials were extruded to validate mixing abilities of the screw. The first blend, designated PC, is a mixture of polyestercarbonate (PCE and polyetherimide (PEI) in the ratio of weight of 85:15 and the second blend, designated PCE, is a mixture of PCE and PEI with weight ratio of 25:75. A third blend, with applications in aerospace industries and designated PEI, contained PEI, PC, PEI-siloxane copolymer in the weight ratio of 75:21:4. The values for individual components are presented in Table 2 below in terms of to shear viscosity in pascal seconds Pa-S at 340° C.

TABLE 2

Shear viscosity of components.

| Shear rate (1/s) | PC | PCE | PEI |
| --- | --- | --- | --- |
| 0 | 550 | 1000 | 1500 |
| 1000 | 450 | 680 | 650 |

The ratio of the viscosities of PCE and PEI is on the order of 1 as the they ranged from 0.67 at zero shear rate to 1.05 at shear rate of $10^3$ 1/s.

Similarly, the ratio of viscosities of PC and PEI range from 0.367 to 0.692 for shear rate of 0 and $10^3$ 1/s, respectively.

All three blends were compounded using the single extruder screw 1 shown in FIG. 8 with prescribed barrel set temperature profiles. As discussed herein above, the number of undercut barriers 2 resulted in a degree of stream splitting, and overall mixing, which is contemplated to be less than that which would be produced by the embodiment shown in FIG. 5. The three blends were also compounded utilizing a modified double wave screw as described herein above for the purpose of comparison of performance. The modified double wave screw utilized is considered the best performing single screw in the prior art in terms of mixing performance for the three blends.

Figure 9:
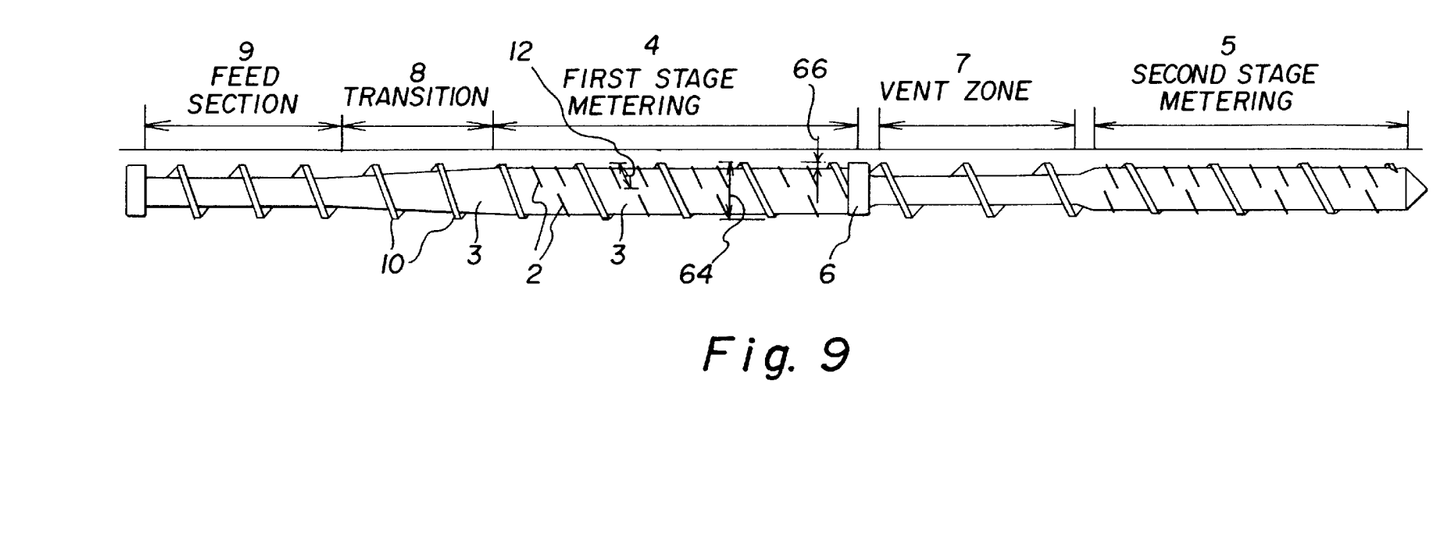
FIG. 9 is a plan view of a single extruder screw of the present invention incorporating undercut barriers and a blister ring.

Relative to the modified double wave screw operating at the same conditions, the embodiment shown in FIGS. 8 and 9 demonstrated a 15–33% increase in throughput. A maximum limit on throughput of the present invention was not investigated while the compounding operation remained very stable and there were no signs of surging. The power consumption in terms of direct current (DC) amperes for the present invention was 20% lower than the modified double wave screw. This reflects the low shear environment offered by the disclosed screw. As described herein, the present invention includes undercut barriers 2 which result in mean peak shear rates which are an order of magnitude less than those of the prior art.

As for the quality of mixing, as judged by morphology obtained using scanning electron microscope (SEM) of the material obtained using the present invention, was either qualitatively similar to or better than that obtained using modified double wave screw. No degradation of materials as observed as reflected from melt flow index values. The melt flow index values of the starting material and the blended material were almost identical. Extrudate temperatures of one embodiment of the present invention were relatively low when compared to a typical observed 10–20% increase in melt flow index values with the modified double wave screw. In addition, materials processed by the present invention had observed mechanical properties, reported as Notched Izod values and heat distortion temperature (HDT), within specified acceptable ranges.

What is claimed is:

1. A single screw extruder for dispersive and distributive mixing, said extruder comprising:

a screw having a continuous flight thereon which defines a channel having a width and a height;

a plurality of baffles disposed in said channel in a predetermined pattern, wherein said predetermined pattern comprises a plurality of non-overlapping rows of parallel baffles arranged along said length of said screw, wherein each baffle in each row is spaced apart equidistant from either another said baffle or said screw flight.

2. A single screw extruder as set forth in claim 1 wherein said baffles have a height less than said height of said screw.

3. A single screw extruder for dispersive and distributive mixing, said extruder comprising:

a screw having a length, said screw including a first metering stage and a second metering stage thereon;

a first continuous flight having a height and a width disposed in said first metering stage which defines a first channel and having a plurality of first baffles disposed therein in a first predetermined pattern;

a second continuous flight having a height and a width disposed in said second metering stage which defines a second channel and having a plurality of second baffles disposed therein in a second predetermined pattern; and wherein said first and second predetermined patterns comprise a plurality of non-overlapping rows of parallel baffles arranged along said length of said screw, wherein each baffle in each row is spaced apart equidistant from either another said baffle or said screw flight.

4. A single screw extruder as set forth in claim 3 further comprising a blister ring positioned on said screw between said first metering stage and said second metering stage, said blister ring having a plurality of slots and lands disposed thereon.

5. A single screw extruder as set forth in claim 4 further comprising a vent zone positioned between said blister ring and said second metering stage.

6. A single screw extruder as set forth in claim 4 wherein said screw includes an axis of rotation and wherein said slots and said lands are parallel to each other and are disposed on said screw at an angle to said axis of rotation.

7. A single screw extruder as set forth in claim 3 wherein said first baffles have a height less than the height of said first flight and wherein said second baffles have a height less than the height of said second flight.

8. A single screw extruder as set forth in claim 3 wherein said baffles in each said row in said first and second patterns increase by one along said length of said screw.

9. A single screw extruder as set forth in claim 3 wherein said baffles in each said row in said first and second patterns alternate between one and two along said length of said screw.

10. A single screw extruder as set forth in claim 3 wherein said screw comprises an outside diameter D and wherein said baffles have a length of about $0.5\,\pi\,D$.

11. A single screw extruder as set forth in claim 3 wherein said channel comprises a depth H and wherein said baffles have a height of about $0.5\,H$.

12. A single screw extruder as set forth in claim 3 wherein said first metering stage comprises an aspect ratio of about 10.3 and said second metering stage comprises an aspect ratio of about 7.8.

13. A mixing feature for a single screw extruder comprising a blister ring positioned on said screw having a plurality of slots and lands disposed thereon; wherein said screw further comprises a plurality of baffles in a predetermined pattern, wherein said predetermined pattern comprises a plurality of non-overlapping rows of parallel baffles arranged along said length of said screw, wherein each baffle in each row is spaced apart equidistant from either another said baffle or said screw flight.

14. A mixing feature as set forth in claim 13 wherein said screw includes an axis of rotation and wherein said slots and said lands are parallel to each other and are disposed on said screw at an angle to said axis of rotation.

15. A mixing feature as set forth in claim 14 wherein said angle is about 6 degrees.

16. A mixing feature as set forth in claim 14 wherein said slots have a width of about 0.25 inches and a depth of about 0.24 inches and wherein said lands have a width of about 0.25 inches.

* * * * *